United States Patent
MacDowell et al.

[15] 3,635,739
[45] Jan. 18, 1972

[54] SILICA-FREE CALCIUM ALUMINATE GLASS-CERAMIC ARTICLES

[72] Inventors: John F. MacDowell, Painted Post; Hermann L. Rittler, Horseheads, both of N.Y.

[73] Assignee: Corning Glass Works, Corning, N.Y.

[22] Filed: June 4, 1969

[21] Appl. No.: 830,523

[52] U.S. Cl. ............................106/39 DV, 106/47 R, 65/33
[51] Int. Cl. ...........................................................C04b 33/00
[58] Field of Search ......................106/39 DV, 47, 52, 47 Q; 65/33

[56] References Cited

UNITED STATES PATENTS

| | | | |
|---|---|---|---|
| 3,007,804 | 11/1961 | Kreidl et al. | 106/39 |
| 3,026,210 | 3/1962 | Coble | 106/39 R |
| 3,338,694 | 8/1967 | Davy | 106/47 R |
| 3,467,534 | 9/1969 | MacDowell | 106/39 DV |
| 3,537,868 | 11/1970 | Kosaka | 106/39 DV |
| 3,545,639 | 12/1970 | Charles et al. | 106/47 R |

OTHER PUBLICATIONS

Rawson, H., Inorganic Glass-Forming Systems, Leadon, 1967 pp. 199–200

Florence, F. M. et al.; Transmittance of Some Calcium Aluminate and Genuandte Glasses, in Journal of Res. Natn' 1, Bur. STDS, 55, 1955 (R.P. No. 2625) pp. 231–237.

Hafner, H. C., et al.; al.; Optical & Physical Properties of Some Calcium Aluminate Glasses, Journ. Amer. Cer. Soc., 41 1958 pp. 315–323.

Leviu, E. M. et al.; The System $BaO-CaO-Al\,O$ , in Phase Diagrams for Ceramists, Ohio, 1969, p. 125

*Primary Examiner*—James E. Poer
*Assistant Examiner*—W. R. Satterfield
*Attorney*—Clarence R. Patty, Jr. and Clinton S. Janes, Jr.

[57] ABSTRACT

This invention relates to the manufacture of translucent-to-transparent glass-ceramic articles in the $BaO-CaO-Al_2O_3$ composition field which are nucleated with $ZrO_2$ and/or $V_2O_5$ and/or $Ta_2O_5$. Such articles are thermally stable to temperatures up to about 1,400° C., exhibit good dielectric properties, are resistant to attack by alkali metal vapors, and transmit well in the infrared portion of the spectrum.

10 Claims, No Drawings

SILICA-FREE CALCIUM ALUMINATE GLASS-CERAMIC ARTICLES

The manufacture of glass-ceramic articles contemplates the controlled crystallization of glass articles through the heat treatment thereof. Thus, in broad terms, the production of glass-ceramic articles entails three general steps: First, a glass-forming batch which normally contains a nucleating agent is melted. Second, this melt is cooled sufficiently rapidly such that an article of glass can be shaped therefrom. Third, the glass article is subjected to a specifically delineated heat treatment so that relatively uniformly sized, fine grained crystals homogeneously dispersed in a glassy matrix are crystallized in situ. The resulting glass-ceramic body is predominantly crystalline, i.e., it is greater than 50 percent by weight crystalline. The heat treatment schedule normally consists of two steps, viz, the glass article is first heated to a temperature above the transformation range of the glass but below the softening point thereof to foster the development of nuclei therein and initiate crystallization. Thereafter, this nucleated article is heated to a temperature above the softening point of the glass to expedite the growth of crystals on the nuclei.

Inasmuch as the crystallization is effected in situ, glass-ceramic articles are nonporous and free from voids, in contrast to the well-known sintered ceramic articles of commerce. Yet, the very high crystallinity of the articles results in the chemical and physical properties exhibited by glass-ceramics being materially different from those of the parent glass and more closely akin to sintered crystalline articles. Finally, the small amount of residual glassy matrix will have a far different composition from that of the parent glass since the components comprising the crystals will have been precipitated therefrom.

It will be appreciated that the crystal phases developed in glass-ceramic articles depend upon the composition of the parent glass and the heat treatment to which the glass is exposed. U.S. Pat. No. 2,920,971 provides an extensive study of the practical aspects and the theoretical considerations involved in the production of glass-ceramic articles as well as a discussion of the crystallization mechanism. Reference is made to that patent for a further explanation of these factors.

We have discovered that translucent-to-transparent glass-ceramic articles exhibiting good dielectric properties, excellent resistance to alkali metal vapors, thermal stability to temperatures approaching 1,400° C., and transmitting well in the infrared portion of the spectrum can be secured by heat treating glass articles consisting essentially, by weight on the oxide basis, of about 4–15% BaO, 35–45% CaO, and 35–45% $Al_2O_3$ which are nucleated with about 5–15% $ZrO_2$ and/or $Ta_2O_5$ and/or $V_2O_5$. Hence, in its broadest aspects, our invention comprises melting a glass-forming batch for a glass of the above composition, simultaneously cooling this melt and shaping a glass article of a desired configuration therefrom, and thereafter exposing this glass article to a temperature between about 900°–1,400° C. for a period of time sufficient to obtain the desired crystallization.

In the specific examples recorded in table I, the batch materials were compounded, ball-milled together to aid in securing a homogeneous melt, and then melted in open platinum crucibles for about 6 hours at 1,600°–1,650° C. in an electrically fired furnace. The melts were stirred for one-half hour to attain good homogeneity, allowed to fine for one-half hour in situ, and subsequently poured upon a cold steel plate to form patties about 4 inches×4 inches×⅜ inch or rolled between steel rollers to form squares about 4 inches×4 inches×1/ INCH) The patties and squares were thereafter transferred to an annealing oven operating at 600°–650° C. and cooled slowly to room temperature. The annealed glass articles, or strips sawed therefrom, were then placed in an electrically heated kiln and heated in accordance with the various time-temperature schedules recorded in table II to transform the glass article into a glass-ceramic article. Finally, the crystallized articles were cooled to room temperature.

It will be appreciated that the batch ingredients utilized may consist of any materials, either the oxides or other compounds, which, on being melted together, will be converted into the desired oxide composition in the proper proportions. Also, if deemed desirable, conventional fining agents such as $As_2O_3$ and $Sb_2O_3$ may be added to the batch in amounts up to about 1% by weight but, inasmuch as the quantity remaining in the glass after the melting step is essentially insignificant, they are omitted from table I.

The mechanism of crystallization involves the two basic steps: First, as the glass article is heated above its transformation range, i.e., the temperature at which a melt is deemed to have become an amorphous solid, this temperature being in the vicinity of the annealing point of the glass, nuclei are formed, and Second, as the nucleated article is heated to a higher temperature, preferably above the softening point of the glass, these nuclei provide sites for the growth of crystals thereon.

It is well known that the crystallization of a glass during heat treatment thereof proceeds more rapidly as the temperature approaches the liquidus of the crystal phase. Nevertheless, although the crystals possess a melting point higher than the softening point of the glass, in the initial stages of crystallization the proportion of crystals to glassy matrix is quite small and the article will not maintain its physical integrity if the temperature is raised too rapidly above its softening point. Therefore, the rate of temperature increase will preferably balance the rate of crystallization; otherwise, deformation resulting from this lowering of viscosity can render the final product generally of little utility.

To insure the securing of an article which is highly crystalline and which demonstrates very little, if any, deformation during heat treatment, we prefer to raise the temperature at a rate not exceeding about 5° C./minute as the article is heated above the softening point of the glass. More rapid rates, e.g., 10° C./minute and even higher, can be employed successfully, particularly where the glass is supported on such auxiliary means as formers or if the glass is first held for a period of time at a temperature near the cooler end of the crystallization range to promote extensive nucleation and initiate growth of crystals. This latter embodiment is founded upon sufficient crystal supporting structure within the glass to restrain the body from deforming.

The rate at which the glass article can be heated from room temperature to the nucleation range is principally dependent upon the thermal shock resistance of the glass itself and the size and configuration of the article involved. In the following examples, the glass bodies were heated at a rate of about 5° C./minute to the nucleation range in order to insure the avoidance of breakage. However, small pieces of these glasses can be plunged directly into a furnace operating at 900° C. without breakage but it will be recognized that considerable deformation during crystallization will be experienced in such practice.

The rate at which the crystallized article can be cooled after heat treatment is also founded upon the thermal shock resistance of the material and the size and geometry of the body. These glass-ceramic materials exhibit coefficients of thermal expansion (25°–300° C.) ranging about $60-90\times10^{-7}/°$ C. In the examples reported in table II, the current to the electric kiln was simply cut off and the furnace allowed to cool to room temperature at its own rate with the crystallized articles retained therein (averaging about 3° C./minute). Much more rapid rates of cooling can be used successfully without causing breakage, it being possible to remove small articles directly from the kiln after the heat treatment and allowing them to cool in the ambient atmosphere.

Another modification in the heat treatment practice of our invention contemplates heat treating the shaped glass article while it is still hot rather than cooling the article to room temperature and then reheating to induce crystallization therein. Thus, the glass shape may simply be cooled to just below the transformation range and thereafter exposed to the heat treatment schedule. It can be seen that this practice provides a more efficient and economical use of heat although it has the concomitant disadvantage of precluding easy visual inspection of the glass quality.

Our preferred heat treatment schedule employs a two-step sequence. Hence, whereas a satisfactorily crystallized article can be obtained by merely raising the temperature of the glass shape to between about 900°–1,400° C. and holding within that range for a period of time sufficient to develop the desired crystallization, we have discovered that body deformation is minimized where a brief dwell period is utilized in the nucleation range or where the temperature of the article is raised quite slowly within that range. This dwell period promotes extensive nucleation and incipient crystallization thereby initiating a sound supporting structure for maintaining the dimensional integrity of the body as the temperature is elevated to expedite further crystallization. Therefore, our preferred practice contemplates holding the glass articles for about 1–4 hours in the range 750°–850° C. prior to crystallizing at 900°–1,400° C.

The rate of crystallization is a function of time and temperature. Therefore, a period of time as long as 24 hours may be required at the cooler end of the crystallization range to insure dense crystallization, whereas at 1,400° C. crystallization may be completed within a half hour. Longer heat treating times do not deleteriously affect the properties of the articles but are normally not economically feasible.

The ranges of BaO, CaO, and $Al_2O_3$ recited above have been found to be critical in providing a uniformly fine-grained glass-ceramic article of high refractoriness, slightly translucent to transparent, and exhibiting good electrical properties. However, certain compatible metal oxides may be present provided the total amount thereof does not exceed about 15% by weight with, in general, the quantity of any individual oxide not exceeding about 10% be weight. Such additions include MgO, ZnO, $B_2O_3$, PbO, $K_2O$, $GeO_2$, $Y_2O_3$, CdO, $WO_3$, NiO, CoO, $Fe_2O_3$, SrO, $La_2O_3$, MnO and $In_2O_3$. These additions may aid in melting and forming the glass, in improving the electrical properties, or in improving the visible and/or infrared transmission of the crystallized product. Nevertheless, inclusion of these oxides will obviously dilute the basic properties of an article formed solely of a $BaO$-$CaO$-$Al_2O_3$ composition, perhaps through the incorporation thereof in the structure of the $BaO$-$CaO$-$Al_2O_3$ crystals or in the change of the residual glass composition remaining after heat treatment.

Other oxides such as $Na_2O$, $Li_2O$, and $P_2O_5$ can be tolerated but, preferably, in amounts less than a total of 10% by weight with individual additions not exceeding about 5% by weight. Fluorine in amounts up to about 3% by weight is satisfactory as a melting aid.

Silica, though preferably absent from the composition may be present in amounts not exceeding about 5% by weight. Its presence results in the development of silicate crystals which dilute the desirable properties provided by the aluminate crystals.

TABLE I

| | 1 | 2 | 3 | 4 | 5 | 6 |
|---|---|---|---|---|---|---|
| $Al_2O_3$ | 40.6% | 43.2% | 42.9% | 45.9% | 41.5% | 42.8% |
| CaO | 36.8 | 39.2 | 40.4 | 36.0 | 36.0 | 42.8 |
| BaO | 6.8 | 7.2 | 4.2 | 4.5 | 6.3 | 4.4 |
| MgO | 6.8 | 3.2 | 4.2 | 4.5 | 6.2 | — |
| $ZrO_2$ | 9.0 | 7.2 | 8.3 | 10.0 | 10.0 | 10.0 |

| | 7 | 8 | 9 | 10 | 11 | 12 |
|---|---|---|---|---|---|---|
| $Al_2O_3$ | 38.3% | 40.5% | 40.5% | 40.5% | 36.0% | 40.5% |
| CaO | 39.3 | 40.5 | 40.5 | 36.0 | 36.0 | 36.0 |
| BaO | 4.5 | 4.5 | 4.5 | 4.5 | 9.0 | 9.0 |
| ZnO | 4.5 | — | 4.5 | — | 4.5 | — |
| MgO | 4.5 | 4.5 | — | — | 4.5 | — |
| CdO | — | — | — | 9.0 | — | — |
| MnO | — | — | — | — | — | 4.5 |
| $ZrO_2$ | 9.9 | 10.0 | 10.0 | 10.0 | 10.0 | 10.0 |

| | 13 | 14 | 15 | 16 | 17 | 18 |
|---|---|---|---|---|---|---|
| $Al_2O_3$ | 40.5% | 40.5% | 40.5% | 43.0% | 38.6% | 39.9% |
| CaO | 36.0 | 36.0 | 36.0 | 40.4 | 37.3 | 37.3 |
| BaO | 9.0 | 9.0 | 9.0 | 8.3 | 7.7 | 7.6 |
| $Fe_2O_3$ | 4.5 | — | — | — | — | — |
| CoO | — | 4.5 | — | — | — | — |
| NiO | — | — | 4.5 | — | — | — |
| $K_2O$ | — | — | — | — | — | 7.6 |
| $ZrO_2$ | 10.0 | 10.0 | 10.0 | — | 7.7 | 7.6 |
| $V_2O_5$ | — | — | — | 8.3 | 7.7 | — |

| | 19 | 20 | 21 | 22 |
|---|---|---|---|---|
| $Al_2O_3$ | 35.0% | 43.3% | 40.5% | 44.0% |
| CaO | 35.0 | 35.4 | 36.0 | 35.0 |
| BaO | 4.2 | 7.0 | 9.0 | 4.0 |
| $K_2O$ | — | 7.1 | — | 8.0 |
| $Y_2O_3$ | 8.6 | — | — | — |
| $GeO_2$ | 8.6 | — | 4.5 | —$La_2O_3$ |
| $ZrO_2$ | 8.6 | 7.1 | 10.0 | — |
| $Ta_2O_5$ | — | — | — | 9.0 |

Table II records the heat treating schedule wherein the temperature was raised at 5° C./minute unless otherwise noted and the articles were cooled to room temperature within the furnace. Table II also reports the crystal phase(s) present in each body, as determined through X-ray diffraction analysis, as well as a visual description of the glass-ceramic article. Table IIa records some measurements of coefficient of thermal expansion ($\times 10^{-7}$/° C.), density (g./cc.), Knoop hardness, dielectric constant at 25° C. (10 kilohertz), loss tangent at 25° C. (10 kilohertz), and D.C. resistivity at 25° C.

TABLE II

| Example No. | Heat Treatment | Visual Description | Crystal Phases |
|---|---|---|---|
| 1 | Hold at 780° C. for 4 hours<br>Heat to 1250° C.<br>Cool to room temperature | Very fine-grained, gray, translucent-to-transparent | $Ca_3Al_2O_6$, $ZrO_2$, $Ca_3Al_{10}O_{18}$ |
| 1 | Hold at 780° C. for 4 hours<br>Heat to 1450° C.<br>Cool to room temperature | Very fine-grained, gray, gray, translucent | $Ca_3Al_2O_6$, $ZrO_2$, $Ca_3Al_{10}O_{18}$ |
| 2 | Hold at 780° C. for 4 hours<br>Heat to 1400° C.<br>Cool to room temperature | Very fine-grained, gray translucent | $Ca_3Al_2O_6$, $ZrO_2$, $Ca_3Al_{10}O_{18}$ |
| 3 | Hold at 780° C. for 4 hours<br>Heat to 1250° C.<br>Cool to room temperature | Very fine-grained, gray translucent-to-transparent | $Ca_3Al_2O_6$, $ZrO_2$, $Ca_3Al_{10}O_{18}$ |
| 4 | Heat to 850° C.<br>Heat to 1300° C. at 1° C./minute<br>Hold at 1300° C. for 10 hours<br>Cool to room temperature | Very fine-grained, gray translucent | $Ca_3Al_2O_6$, $ZrO_2$, $Ca_3Al_{10}O_{18}$ |
| 5 | Heat to 850° C.<br>Heat to 1300° C. at 1° C./minute<br>Hold at 1300° C. for 10 hours<br>Cool to room temperature | Very fine-grained, gray translucent-to-transparent | $Ca_3Al_2O_6$, $ZrO_2$, $Ca_3Al_{10}O_{18}$ |
| 6 | Hold at 860° C. for 2 hours<br>Hold at 1200° C. for 4 hours<br>Cool to room temperature | Very fine-grained, gray translucent | $Ca_3Al_2O_6$, $ZrO_2$, $Ca_3Al_{10}O_{18}$ |
| 7 | Heat to 850° C.<br>Heat to 1300° C. at 1° C./minute<br>Hold at 1300° C. for 10 hours<br>Cool to room temperature | Very fine-grained, gray translucent | |

TABLE II—Continued

| Example No. | Heat Treatment | Visual Description | Crystal Phases |
|---|---|---|---|
| 8 | Heat to 850° C. Heat to 1200° C. at 1° C./minute Hold at 1200° C. for 10 hours Cool to room temperature | Very fine-grained, gray translucent | $Ca_3Al_2O_6$, $ZrO_2$, $Ca_3Al_{10}O_{18}$ |
| 9 | Hold at 900° C. for 2 hours Hold at 1300° C. for 4 hours Cool to room temperature | Very fine-grained, gray translucent | $Ca_3Al_2O_6$, $ZrO_2$, $Ca_3Al_{10}O_{18}$ |
| 10 | Heat to 850° C. Heat to 1200° C. at 1° C./minute Hold at 1200° C. for 10 hours Cool to room temperature | Very fine-grained, gray translucent | |
| 11 | Hold at 900° C. for 2 hours Hold at 1300° C. for 4 hours Cool to room temperature | Very fine-grained, gray translucent | |
| 12 | Heat to 850° C. Heat to 1200° C. at 1° C./minute Hold at 1200° C. for 10 hours Cool to room temperature | Very fine-grained, gray translucent | $Ca_3Al_2O_6$, $ZrO_2$, $BaAl_2O_{19}$ |
| 13 | Heat to 850° C. Heat to 1200° C. at 1° C./minute Hold at 1200° C. for 10 hours Cool to room temperature | Very fine-grained, gray translucent | |
| 14 | Heat to 850° C. Heat to 1200° C. at 1° C./minute Hold at 1200° C. for 10 hours Cool to room temperature | Very fine-grained, gray translucent | $Ca_3Al_2O_6$, $ZrO_2$, $BaAl_2O_{19}$ |
| 15 | Heat to 850° C. Heat to 1200° C. at 1° C./minute Hold at 1200° C. for 10 hours Cool to room temperature | Very fine-grained, gray translucent | |
| 16 | Hold at 800° C. for 4 hours Hold at 1200° C. for 2 hours Hold at 1300° C. for 4 hours | Very fine-grained, gray translucent-to-transparent | $Ca_3(V, Al)_2V_3O_{12}$ |
| 17 | Hold at 800° C. for 4 hours Hold at 1200° C. for 2 hours Hold at 1300° C. for 4 hours | Very fine-grained, gray translucent-to-transparent | $Ca_3Al_2O_6$, $ZrO_2$ |
| 18 | Hold at 780° C. for 4 hours Heat to 1300° C. Cool to room temperature | Very fine-grained, gray translucent | $Ca_3Al_2O_6$, $ZrO_2$, $BaAl_{12}O_{19}$ |
| 19 | Hold at 760° C. for 4 hours Heat to 950° C. Cool to room temperature | Very fine-grained, gray translucent-to-transparent | $Ca(AlO)_2$, $ZrO_2$, $Ca_3Al_2O_6$, unknown phase |
| 20 | Hold at 800° C. for 4 hours Heat to 1200° C. Cool to room temperature | Very fine-grained, gray translucent | $Ca_3Al_2O_6$, $ZrO_2$, $Ca_3Al_{10}O_{18}$ |
| 21 | Hold at 900° C. for 2 hours Hold at 1200° C. for 4 hours Cool to room temperature | Very fine-grained, gray translucent | |
| 22 | Hold at 850° C. for 2 hours Heat to 1190° C. at 1° C./minute Hold at 1190° C. for 10 hours Cool to room temperature | Very fine-grained, gray translucent | $Ca_3Al_2O_6$, $Ta_2O_5$, $Ca_3Al_{10}O_{18}$ |

TABLE IIa

| Example No. | Exp. Coeff. | Knoop Hardness | Dielectric Constant | Loss Tangent | D.C. Resistivity | Density |
|---|---|---|---|---|---|---|
| 1 | 72 | 691 | 11.79 | 0.0007 | $\ln\rho => 14.59$ | 3.144 |
| 1 | 72 | 579 | | | | 2.933 |
| 2 | 68.5 | | | | | 3.070 |
| 3 | 75 | 738 | 11.66 | 0.0007 | $\ln\rho => 14.33$ | 3.147 |
| 4 | | | | | | |
| 5 | | | 11.2 | 0.0014 | $\ln\rho => 14.61$ | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | 81 | | | | | |
| 17 | | | | | | 3.133 |
| 18 | 82 | 655 | 10.65 | 0.0007 | $\ln\rho => 13.0$ | 3.128 |
| 19 | 80 | | | | | |
| 20 | 81 | 634 | | | | 3.148 |
| 21 | | | | | | |
| 22 | | | | | | |

It can be observed that these materials exhibit very good electrical insulating properties. This factor, coupled with their resistance to alkali metal vapors, their high refractoriness, and their high transmission of visible and infrared radiations, has strongly recommended their use as high-temperature lamp envelopes. Another feature of these compositions which has led to their use as lamp envelopes is the ability to redraw such glass tubing without devitrification occurring to a significant extent. Hence, these glasses can be reheated and shaped by conventional means at a temperature above which the glass has a viscosity above about $10^7$ poises but below the softening point thereof.

Laboratory tests have demonstrated that the total crystal content of these glass-ceramic articles is dependent upon the extent to which the batch constituents are adaptable to the formation of crystal phases. However, it has been determined that this crystal, content, in general, is greater than 50% by weight and is commonly in excess of 75% by weight. The crystals, themselves, are uniformly very fine-grained, substantially all being smaller than 5 microns in diameter. The principal crystal phases present have been demonstrated to be barium and/or calcium aluminate with very minor amounts of zirconia frequently being observed when $ZrO_2$ is employed as the nucleating agent.

Example I heat treated in accordance with the first schedule set out in table II constitutes the preferred embodiment of our invention. The resulting glass-ceramic article is very highly crystalline with relatively uniformly fine-grained crystals averaging less than about 1 micron in diameter. The article is almost completely transparent, is thermally stable at temperatures up to 1,300° C., exhibits excellent electrical insulating properties, is resistant to alkali metal vapors, and transmits well in the infrared portion of the spectrum.

We claim:

1. A substantially $SiO_2$-free glass, thermally crystallizable to a transparent to-translucent glass-ceramic article consisting essentially, by weight on the oxide basis, of about 4–15% BaO, 34–45% CaO, 35–45% $Al_2O_3$, and 5–15% of at least one metal oxide selected from the group consisting of $ZrO_2$, $Ta_2O_5$, and $V_2O_5$.

2. A glass according to claim 1 containing up to 15% by weight total of at least one metal oxide in individual amounts not exceeding about 10% by weight selected from the group consisting of MgO, ZnO, $B_2O_3$, PbO, $K_2O$, $GeO_2$, $Y_2O_3$, CdO, $WO_3$, NiO, CoO, $Fe_2O_3$, SrO, MnO, $La_2O_3$, and $In_2O_3$.

3. A substantially $SiO_2$-free, translucent-to-transparent glass-ceramic article wherein the crystal content thereof comprises at least 50% by weight of the article and wherein a barium and/or calcium aluminate constitutes the principal crystal phase, said crystals being formed through the crystallization in situ of a glass body consisting essentially, by weight on the oxide basis, of about 4–15% BaO, 35–45% CaO, 35–45% $Al_2O_3$, and 5–15% of at least one metal oxide selected from the group consisting of $ZrO_2$, $Ta_2O_5$, and $V_2O_5$.

4. A glass-ceramic article according to claim 3 containing up to about 15% by weight total of at least one metal oxide in individual amounts not exceeding about 10% percent by weight selected from the group consisting of MgO, ZnO, $B_2O_3$, PbO, $K_2O$, $GeO_2$, $Y_2O_3$, CdO, $WO_3$, NiO, CoO, $Fe_2O_3$, SrO, MnO, $La_2O_3$, and $In_2O_3$.

5. A glass-ceramic article according to claim 3 containing up to about 10% by weight total of at least one metal oxide in individual amounts not exceeding about 5% by weight selected from the group consisting of $Na_2O$, $Li_2O$, $SiO_2$, and $P_2O_5$.

6. A method for making a substantially $SiO_2$-free, translucent-to-transparent glass-ceramic article wherein the crystal content thereof is at least 50% by weight of the article and wherein a barium and/or calcium aluminate constitutes the principal crystal phase which comprises:
  a. melting a batch for a glass consisting essentially, by weight on the oxide basis, of about 4–15% BaO, 35–45% CaO, 35–45% $Al_2O_3$, and at least one metal oxide selected from the group consisting of $ZrO_2$, $Ta_2O_5$, and $V_2O_5$;
  b. simultaneously cooling the melt at least below the transformation range thereof and shaping a glass article therefrom;
  c. heating said glass article between about 900°–1,400° C. for a period of time sufficient to obtain the desired crystallization; and then
  d. cooling said crystallized article to room temperature.

7. A method according to claim 6 wherein said glass contains up to about 15% by weight total of at least one metal oxide in individual amounts not exceeding about 10% by weight selected from the group consisting of MgO, ZnO, $B_2O_3$, PbO, $K_2O$, $GeO_2$, $Y_2O_3$, CdO, $WO_3$, NiO, CoO, $Fe_2O_3$, SrO, MnO, $La_2O_3$, and $In_2O_3$.

8. A method according to claim 5 wherein said glass contains up to about 10% by weight of at least one metal oxide in individual amounts not exceeding about 5% by weight selected from the group consisting of $Na_2O$, $Li_2O$, $SiO_2$, and $P_2O_5$.

9. A method according to claim 6 wherein said time sufficient to obtain the desired crystallization ranges about ½–24 hours.

10. A method according to claim 6 wherein said glass article is heated at about 750°–850° C. for about 1–4 hours prior to crystallizing at 900°–1,400° C.

* * * * *